United States Patent
Sebastiani

(12)
(10) Patent No.: US 6,412,214 B1
(45) Date of Patent: Jul. 2, 2002

(54) FISHING LURE

(76) Inventor: John B. Sebastiani, 2467 Eisenhower Ct., Des Plaines, IL (US) 60018

( * ) Notice: Subject to any disclaimer, the term of this patent is extended or adjusted under 35 U.S.C. 154(b) by 0 days.

(21) Appl. No.: 09/692,528

(22) Filed: Oct. 19, 2000

(51) Int. Cl.[7] .............................................. A01K 85/01
(52) U.S. Cl. ..................................... 43/42.06; 43/42.06
(58) Field of Search ............................ 43/42.06, 42.31, 43/42.35

(56) References Cited

U.S. PATENT DOCUMENTS 3,309,811 A * 3/1967 Wimer ....................... 43/42.06
5,155,947 A * 10/1992 Rivard ....................... 43/42.06

* cited by examiner

Primary Examiner—Thomas Price
(74) Attorney, Agent, or Firm—Charles F. Meroni, Jr.; Meroni & Meroni, P.C.

(57) ABSTRACT

The present invention concerns a fishing lure that comprises a body member comprising a leading end, a tail end, a top side, a bottom side, an outer shell, a passageway, a reservoir, and a ball located within the passageway for controlling the releasal of attractant from the reservoir. The outer shell longitudinally extends from the leading end to the tail end along a longitudinal axis and axially extends concentrically about the longitudinal axis from the top side to the bottom side and encloses a cavity defined therein and has an outer opening along the bottom side. The reservoir and the passageway are located within the cavity and are fluidly connected to each another with the reservoir extending from the top side to the passageway and the passageway extending from the bottom side towards the top side and the tail end. The ball is located in the passageway for back-and-forth translation therein when the body member undergoes abrupt jerking movement for opening and closing the fluid connection between the reservoir, the passageway, and the outer opening for releasing attractant therefrom. At least one hook is attached to the body member and a fishing line and fishing pole can also be provided for imparting the abrupt jerking movement.

24 Claims, 2 Drawing Sheets

FISHING LURE

BACKGROUND OF THE INVENTION

1. Field of the Invention

The present invention relates to fishing equipment and recreational devices for attracting fish, although other uses, such as devices for attracting other game and aquatic life are within the scope of the invention. More specifically, the present invention is primarily intended as a fishing lure and the like.

2. Description of the Related Art

Fishing is a popular outdoor activity and worldwide source of food provision. Fishing equipment has developed through the years to meet the need, art, and sport of fishing. In particular, fishing lures have developed and evolved during the last century into an important tool for enhancing and improving fishing. Various fishing lures have been developed and used in an effort to improve the quality and productivity of this outdoor activity. In particular, lures designed for the storage and dispersion of fishing attractant have been developed. This development, however, has also resulted in complexity in lures and in the manufacturing of lures as well as in a decrease in the effectiveness of the lures themselves due to excessive mixing of the fish attractant inside the lure prior to discharge to the surrounding water.

For example, U.S. Pat. No. 4,888,907, which issued to Gibbs discloses a fishing lure that includes a bladder and valve assembly combination provided within a cavity of the fishing lure for providing controlled discharge of a fish attractant. This combination requires the assistance of the environment, water, and gravity to discharge the attractant through the valve. Moreover, the valve can operate to release or drip attractant even when the lure is not used during fishing because the valve can be adjusted to an open configuration that the user can fail to close when the lure is not in use. Hence fishing attractant can be needlessly wasted.

U.S. Pat. No. 4,047,317 discloses a Fish Lure having a hollow body portion formed of complimentary shells pivotally secured together at one end and provided with fish attractant carried within the lure body. The attractant is dispersed via openings at each end in the lure body by means of water which is allowed and required to enter and leave the lure cavity as the lure is pulled through the water. In addition, the scent-dispensing lure of U.S. Pat. No. 4,964,235 provides a lure including a liquid-dispensing cavity and a mixing mechanism for mixing fish-attracting liquid and environmental water in the cavity. An inlet at the front end for entry of the environmental water and at an outlet port at the back end for discharge of the mixed liquid and water are also provided.

Finally, the Scented Fishing Lure of U.S. Pat. No. 5,155,947 requires passage of water through a cavity containing liquid fishing attractant and an absorbent material. The '947 device requires that the lure be trolled, reeled, or pulled through water. The water then enters the lure and cavity, flows through the cavity and over a baffle, and disperses out an exit aperture carrying small amounts of the attractant with it. Hence, in the '317, '235, and '947 devices the attractant can be needlessly diluted while still in the lure and prior to discharge and this dilution could decrease the effectiveness of the attractant.

Therefore it is important and necessary that a fishing lure be developed for overcoming these challenges in the art. The fishing lure should control discharge from the lure while minimizing preliminary mixing of attractant with water before discharge to the environment. It should require independent, external force to discharge the attractant whereafter a self-closing mechanism should be provided for minimizing waste of attractant. It is also desirable that the fishing lure be inexpensive, simple to manufacture, easy to use, and applicable to various types of fishing and gaming devices, and the like.

Other objects of my invention, as well as particular features, elements, and advantages thereof, will be elucidated in, or apparent from, the following description and the accompanying drawing figures.

SUMMARY OF THE INVENTION

The present invention provides a device for fishing or gaming activities that comprises a fishing lure device. The fishing lure device comprises a body member that itself comprises a leading end, a tail end, a top side, a bottom side, and an outer shell that longitudinally extends from the leading end to the tail end along a longitudinal axis and axially extends concentrically about the longitudinal axis from the top side to the bottom side for enclosing a cavity defined therein. The outer shell has an outer opening along the bottom side. The body member also comprises a reservoir and a passageway located within the cavity and fluidly connecting to each other. The reservoir extends from the top side to the passageway and the passageway extends from the bottom side towards the top side and the tail end and includes a ball located therein for back-and-forth translation within the passageway when the body member undergoes abrupt movement for opening and closing the fluid connection between the reservoir, the passageway, and the outer opening for releasing attractant therefrom. The fishing lure also comprises at least one hook attached to the body member.

Another embodiment of the present invention provides in combination, a fishing device comprising a fishing lure and a fishing pole. The fishing lure comprises a body member that has a cavity defined therein and comprises a passageway and a reservoir located within the cavity. A ball is located within the passageway for back-and-forth translation between an unsettled open position and a seated closed position. The ball translates towards the unsettled open position during abrupt jerking motion of the fishing lure and reseats in the seated closed position thereafter. The passageway is fluidly connected to the reservoir for passage of fluids therethrough as the ball translates towards the unsettled open position for discharging the fluids from the fishing lure. The passageway extends from the bottom side towards the top side and the tail end. The fishing pole comprises a fishing line attached to the fishing lure for communicating the abrupt jerking motion to the fishing lure for releasing the fluids therefrom.

In still another embodiment of the present invention, a fishing device is provided and comprises a body member constructed of inflexible material and having a cavity defined therein. The body member comprises a passageway and a reservoir located within the cavity and a ball being located within the passageway for back-and-forth translation between an unsettled open position and a seated closed position. The ball temporarily translates towards the unsettled open position during abrupt jerking motion of the body member and reseats in the seated closed position thereafter. The passageway is fluidly connected to the reservoir for passage of fluids therethrough and thereout of the body member as the ball temporarily translates towards the unsettled open position. Fluid passage can be stopped when the ball returns to the seated closed position.

Hence, the present invention provides a fishing lure developed for overcoming challenges in the art. The fishing lure of the present invention can control discharge from the lure while minimizing preliminary mixing of attractant with water before discharge to the environment. It can require independent, external force to discharge the attractant whereafter a self-closing mechanism is provided for minimizing waste of attractant. The fishing lure of the present invention can also be inexpensive, simple to manufacture, easy to use, and applicable to various types of fishing and gaming devices, and the like.

DESCRIPTION OF THE DRAWINGS

Other features of my invention will become more evident from a consideration of the following detailed description of my patent drawings, as follows.

DETAILED DESCRIPTION OF THE PREFERRED EMBODIMENT

Figure 1:
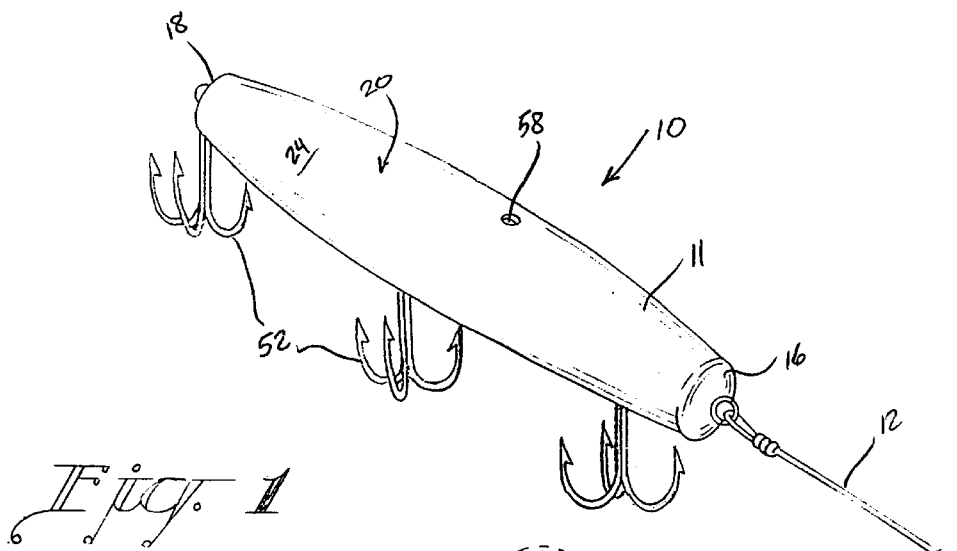
FIG. 1 is a perspective top view of an embodiment of the present invention showing a fishing lure.

Referring now to the drawings, the present invention concerns a fishing lure for fishing and gaming activities as illustrated by way of example in FIGS. 1–6. It is not intended that the present invention be limited solely to fishing lures, rather the scope of the invention includes other devices and the like for attracting other game and aquatic life.

As is illustrated in FIGS. 1–6, the present invention includes a fishing lure 10, for use in fishing and gaming activities and for attachment to fishing poles and the like. The fishing lure 10 can be attached to the fishing pole with a fishing line 12 as shown in FIGS. 1–3 and 6, or with any other means within the scope of the present invention as described herein. The fishing lure 10 can then be placed and moved through a medium 14 (FIG. 3), such as water, for use in catching fish and other game.

The fishing lure 10 comprises a body member 11 comprising a leading end 16, a tail end 18, a top side 20, and a bottom side 22 as shown in FIGS. 1–4. In addition, the fishing lure comprises an outer shell 24 longitudinally extending from the leading end 16 to the tail end 18 along a longitudinal axis 26 and also axially extending concentrically about the longitudinal axis 26 from the top side 20 to the bottom side 22 enclosing a cavity 28 defined therein. Preferably the body member 11 of the fishing lure 10, and particularly the outer shell 24, are constructed of a rigid or nonflexible material for imparting the characteristics and functions described herein. For example, the body member 11 and/or outer shell 24 can be constructed of a plastic, metal, glass or other nonflexible material.

The body member 11 also comprises important features of the present invention, namely a passageway 30 and a reservoir 32 located within the cavity 28 as shown in FIGS. 2–5. The passageway and the reservoir are preferably connected 33 for passage or discharge of an attractant 34 from the reservoir 32 through the passageway 30, or a portion of the passageway, and out of the body member 11 of the fishing lure 10 through an opening 35 and into the medium 14 for attracting fish and the like to the lure. The attractant 34 can include scented fluids and the like as are used in the fishing or gaming industry. The passageway and the reservoir can be located and positioned as illustrated or may be positioned in any manner which accomplishes the objectives of the invention. The passageway and the opening 35 are preferably located for discharge along the bottom side 22. As shown, the passageway and the reservoir can connect the top side 20 and the bottom side 22 along a medial portion 36 of the body member 11. It is important that the passageway 30, as well as the reservoir 32, are each angled at an angle 38, 40 respectively as measured from the longitudinal axis 26. It is preferred that at least the passageway be angled at an acute angle for operation of the present invention, although the reservoir can be angled at an acute angle from the longitudinal axis as well. For example, the reservoir and the passageway can be approximately orthogonally positioned relative to one another and/or the passageway can be angled from the bottom side 22 toward the top side 20 and the tail end 18 while the reservoir can be angled from the top side 20 towards the passageway.

Figure 2:
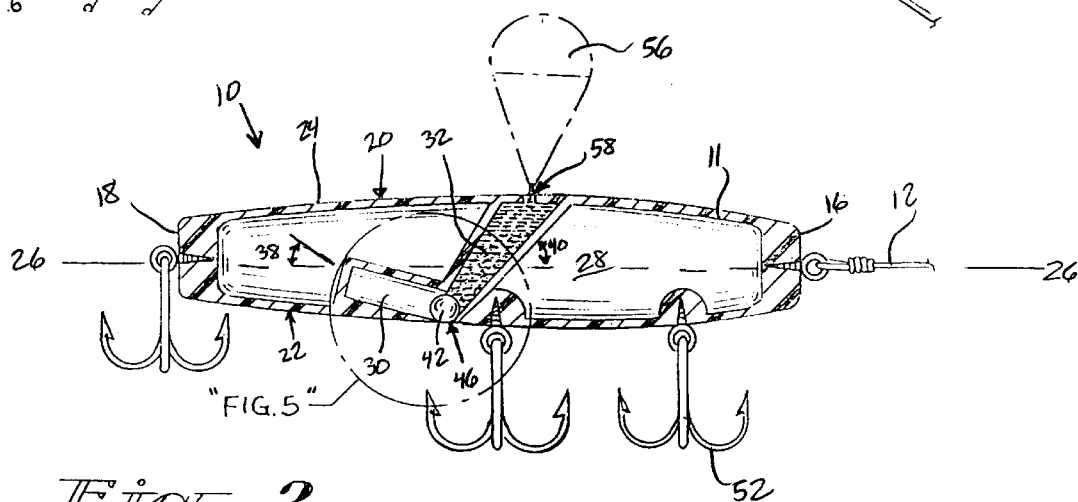
FIG. 2 is a cross-sectional view of the fishing lure of the present invention showing a reservoir and a passageway containing a ball for controlling discharge of an attractant and a device for refilling the reservoir with attractant.
Figure 3:
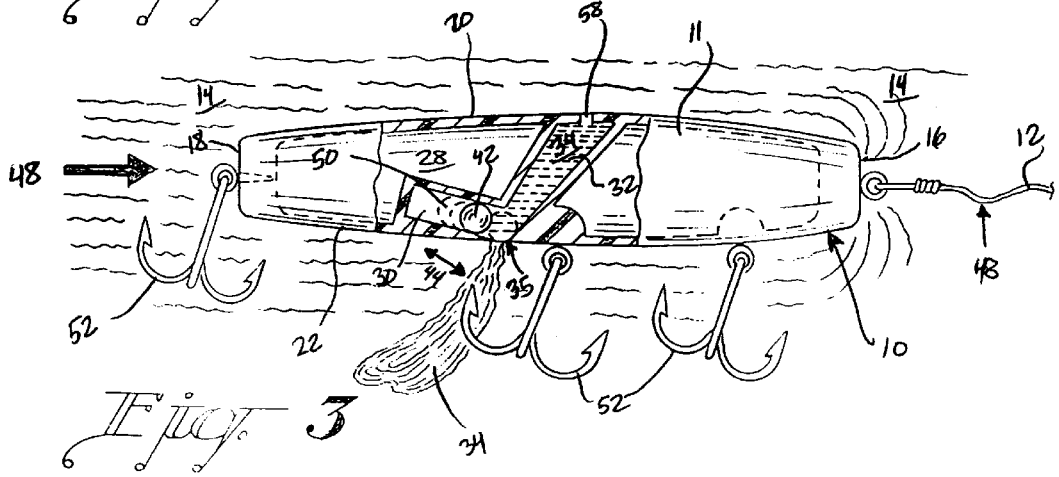
FIG. 3 is a cross-sectional view of the fishing lure of the present invention as it is pulled through a medium illustrating translation of the ball during or following jerking of the lure for discharging attractant to the medium.
Figure 4:
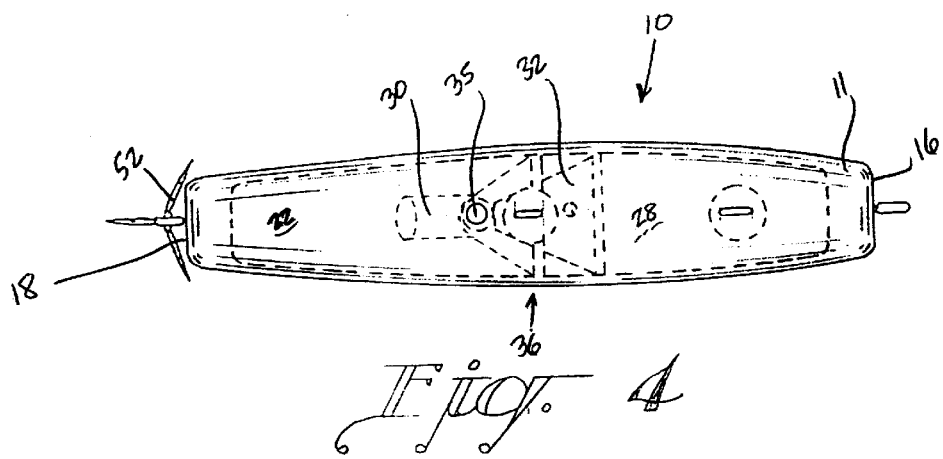
FIG. 4 is a plan bottom view of the fishing lure of the present invention showing positioning and sizing of the passageway and reservoir relative to a body member of the lure.
Figure 5:
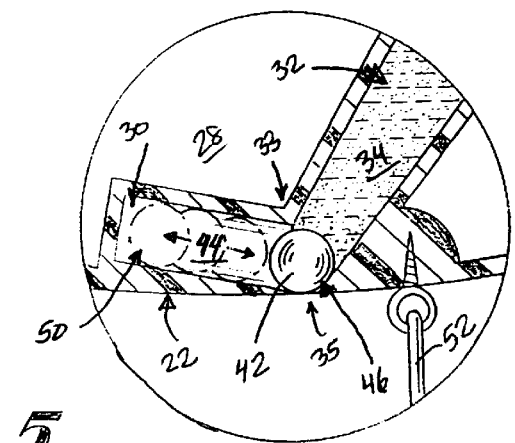
FIG. 5 is an enlarged cross-sectional view of the fishing lure of FIG. 2, showing the back-and-forth translation of the ball within the passageway for allowing controlled discharge of attractant located in the reservoir.

As is illustrated in FIGS. 2–5, a ball 42 or bearing is located in the passageway 30 and the passageway is sized sufficiently to accommodate the ball along the passageway for back-and-forth translation 44 (FIGS. 3 and 5). This translation can be made by rolling motion, sliding motion, or by any combination of rolling and sliding so long as the ball functions as described. The angle 38 of the passageway 30 is important to the translation and function of the ball 42 as the angle 38 and gravity assist the return of the ball 42 to a seated or resting position 46 for directly sealing off, closing, and blocking the connection 33 between the passageway and the reservoir 32 at the opening 35. Hence the translation and seating of the ball acts for closing the connection therein and for preventing discharge of the attractant 34 to the medium 14. The ball can also prevent wasting or premixing of the attractant with the medium.

Importantly, the back-and-forth translation 44 (FIGS. 3 and 5) can be activated by jerking or applying an abrupt movement 48 to the fishing lure 10. For example, the fishing line 12 can be tightened and pulled, hence pulling and accelerating the fishing lure 10 after which the line can be slackened and the lure decelerated or returned to a stationary position. This type of action preferably occurs during the casting and retrieval operations typical of fishing. The abrupt movement 48, or twitching, can cause the ball 42 to momentarily leave the closed seated or resting position 46 and move towards an unsettled open position 50 during the abrupt jerking motion. During this translation towards the unsettled open position 50 the attractant 34 can be released from the reservoir 32 through the opening 35 and into the medium 14. The present invention can also then quickly return the ball to the closed seated or resting position 46 as the tightened line 12 slackens, the fishing lure 10 slows down under the drag in the medium 14, and the angle 38 and gravity coact to return the ball 42 to the stable closed position 46. The quick back-and-forth translation 44 can function to allow a controlled amount of the attractant 34 to exit the fishing lure 10 and can operate to decrease the amount of attractant wasted and the potential for premixing of the medium with the attractant prior to discharge.

Figure 6:
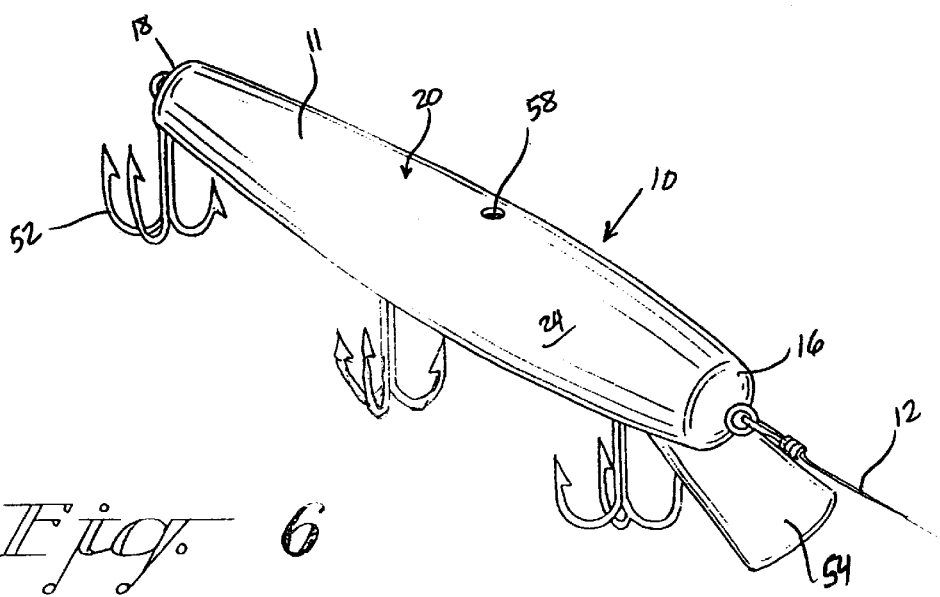
FIG. 6 is a perspective top view of the fishing lure of the present invention showing a diving lip device for aiding operation and for attracting deeper swimming aquatic life.

As is shown in FIGS. 1–4 and 6, the fishing lure 10 also comprises at least one hooking device 52 which can include the various hooks used in the art such as gang hooks, single hooks, barbed hooks, and the like. The hooking device can be attached on the various locations of the fishing lure 10, for example, on the leading end 16, the tail end 18, and/or the bottom side 22. Moreover, as is shown in FIG. 6, the fishing lure 10 can also include a diving lip 54 for assisting the maneuverability of the fishing lure through the medium 14 and the diving lip can be positioned at the leading end 16 for helping the lure to dive into the medium.

The reservoir 32 of the fishing lure 10 of the present invention can be recharged with the attractant 34 by means of a filling device 56, such as a bulbed device or the like, as illustrated in FIG. 2. The filling device can be inserted into another opening 58 located along the top side 20 and connected to the reservoir 32. The attractant 34 can then be discharged from the filling device through the opening 58 and into the reservoir as required or needed.

Finally, the fishing lure 10 is preferably constructed of the rigid or nonflexible material such as synthetic plastic, metal, glass or other nonflexible materials for imparting the abrupt movement 48 to the ball 42. The fishing lure can also be constructed to be a solid piece except for the passageway and the reservoir. The ball 42 can be constructed of like materials, but is preferably constructed of metal materials and the like so as to have a greater mass or weight for resisting the pressures placed upon it from the medium 14 (i.e. hydrostatic pressures) for remaining in the closed position 46 and for increasing the momentum of the translation 44 for quicker return to the closed position 46. The ball and the passageway 30 are also preferably sized with the ball having a diameter sized slightly smaller than the diameter of the passageway. For example, the ball can have a 3/16" diameter and the passageway a diameter 1/32" larger than the ball's. Hence, these sizes can allow for rolling, sliding, and other translations. As with fishing lures in the art, the fishing lure 10 of the present invention can be sized to be around 4 inches long by a ½ inch wide. The fishing lure can also be painted or decorated according to techniques and designs as found in the art. Hence, the fishing lure 10 can be manufactured of simple materials and in a simplified construction for decreasing manufacturing costs.

In construction and in use the present invention therefore provides a fishing lure developed for overcoming challenges in the art. The fishing lure of the present invention can control discharge from the lure while minimizing preliminary mixing of attractant with water before discharge to the environment. It can require independent, external force to discharge the attractant whereafter a self-closing mechanism is provided for minimizing waste of attractant. The fishing lure of the present invention can also be inexpensive, simple to manufacture, easy to use, and applicable to various types of fishing and gaming devices, and the like.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

What is claimed is:

1. A fishing lure device comprising:
a body member comprising a leading end, a tail end, a top side, a bottom side, an outer shell longitudinally extending from the leading end to the tail end along a longitudinal axis and axially extending concentrically about the longitudinal axis from the top side to the bottom side enclosing a cavity defined therein and having an outer opening along the bottom side, and a reservoir and a passageway located within the cavity and fluidly connecting to each another, the reservoir extending from the top side to the passageway, the passageway extending from the bottom side towards the top side and the tail end and including a ball located therein for back-and-forth translation within the passageway when the body member undergoes abrupt movement for opening and closing the fluid connection between the reservoir, the passageway, and the outer opening for releasing attractant therefrom; and at least one hook attached to the body member.

2. The fishing lure device of claim 1, wherein the reservoir and the passageway provide a connection between the top side and the bottom side along a medial portion of the outer shell.

3. The fishing lure device of claim 1, wherein the reservoir extends from the top side to the passageway at a first acute angle measured from the longitudinal axis and the passageway extends from the bottom side towards the top side and the tail end at a second acute angle measured from the longitudinal axis.

4. The fishing lure device of claim 3, wherein the second acute angle is sized for gravity return of the ball for closing the fluid connection between the reservoir, the passageway, and the outer opening during the back-and-forth translation within the passageway.

5. The fishing lure device of claim 3, wherein the back-and-forth translation of the ball within the passageway is along the second acute angle and the passageway is sized for sliding displacement of the ball for opening and closing the fluid connection between the reservoir, the passageway, and the outer opening.

6. The fishing lure device of claim 1, wherein the body member is attached at the leading end to a line for imparting the abrupt movement to the body member.

7. The fishing lure device of claim 6, wherein the line is attached to a fishing pole device.

8. The fishing lure device of claim 1, wherein the body member further comprises a diving lip attached to the leading end.

9. The fishing lure device of claim 1, wherein the hook is attached either along the bottom end or along the tail end.

10. The fishing lure device of claim 1, wherein the hook is a gang hook.

11. The fishing lure device of claim 1, wherein the body member is configured for attachment with a filling device along the top side for filling the reservoir.

12. The fishing lure device of claim 1, wherein the body member is inflexible.

13. The fishing lure device of claim 12, wherein the body is constructed of metal, plastic, or glass material.

14. The fishing lure device of claim 1, wherein the reservoir and the passageway are located in a medial portion of the body member.

15. In combination, a fishing device comprising:
is a fishing lure including a body member having a cavity defined therein and comprising a passageway and a reservoir located within the cavity, a ball being located within the passageway for back-and-forth translation between an unsettled open position and a seated closed position, the ball translating towards the unsettled open position during abrupt jerking motion of the fishing lure and reseating in the seated closed position thereafter, the passageway being fluidly connected to the reservoir for passage of fluids therethrough as the ball translates towards the unsettled open position for discharging the fluids from the fishing lure, the passageway extending from the bottom side towards the top side and the tail end; and a fishing pole comprising a fishing line attached to the fishing lure for communicating the abrupt jerking motion to the fishing lure for releasing the fluids therefrom.

16. The combination of claim 15, wherein the body member comprises at least one hook.

17. The combination of claim 15, wherein the reservoir and the passageway extend in approximately orthogonal directions from one another, the passageway being angled for returning and reseating the ball following the abrupt jerking motion.

18. The combination of claim 15, wherein the body member is constructed of a rigid or inflexible material.

19. The combination of claim 15, wherein the fishing line is manually and momentarily jerked and then loosened for initiating the back-and-forth translation of the ball within the passageway.

20. A fishing lure device comprising:

a body member comprising a leading end, a tail end, a top side, a bottom side, an outer shell longitudinally extending from the leading end to the tail end along a longitudinal axis and axially extending concentrically about the longitudinal axis from the top side to the bottom side enclosing a cavity defined therein and having an outer opening along the bottom side, and a reservoir and a passageway located within the cavity and fluidly connecting to each another, the reservoir extending from the top side to the passageway, fluid attractant in the reservoir, the passageway extending from the bottom side towards the top side and the tail end and including a ball located therein for back-and-forth translation within the passageway when the body member undergoes abrupt movement for opening and closing the fluid connection between the reservoir, the passageway, and the outer opening for releasing attractant therefrom and through said-outer opening.

21. The fishing lure device of claim 20, wherein the reservoir and the passageway provide a connection between the top side and the bottom side along a medial portion of the outer shell, the back and forth translation of the ball allowing fluid attractant to be released through said outer opening when said ball is moved to open said fluid connection.

22. The fishing lure device of claim 20, wherein the reservoir extends from the top side to the passageway at a first acute angle measured from the longitudinal axis and the passageway extends from the bottom side towards the top side and the tail end at a second acute angle measured from the longitudinal axis.

23. The fishing lure device of claim 22, wherein the second acute angle is sized for gravity return of the ball for closing the fluid connection between the reservoir, the passageway, and the outer opening during the back-and-forth translation within the passageway.

24. The fishing lure device of claim 22, wherein the back-and-forth translation of the ball within the passageway is along the second acute angle and the passageway is sized for sliding displacement of the ball for opening and closing the fluid connection between the reservoir, the passageway, and the outer opening.

* * * * *